United States Patent Office 3,262,908
Patented July 26, 1966

3,262,908
THERMOPLASTIC MASSES BASED ON HIGH MOLECULAR WEIGHT POLYOXYMETHYLENES STABILIZED WITH NITRO AROMATIC COMPOUNDS
Jürgen Behrends, Hanau am Main, Germany, assignor to Deutsche Gold- und Silber-Scheideanstalt vormals Roessler, Frankfurt am Main, Germany
No Drawing. Filed Aug. 12, 1963, Ser. No. 301,656
Claims priority, application Germany, July 16, 1960, D 33,793
3 Claims. (Cl. 260—45.9)

This is a continuation-in-part of application S.N. 122,426, filed July 7, 1961 now abandoned.

The present invention relates to improved thermoplastic masses based on high molecular weight polyoxymethylenes which only decompose to a slight extent during hot shaping.

The so-called polyoxymethylenes, which are produced by polymerization of monomeric formaldehyde or oligomers of formaldehyde with most varied types of catalysts, upon heating over their melting point decompose to monomeric formaldehyde in a short period of time. It is known that this decomposition which proceeds from the ends of the chains according to a hookless fastener type of reaction can be prevented to a certain extent by blocking the end hydroxyl groups. Such blocking of the end groups can be attained by their etherification or esterification. However, at raised temperatures above about 160° C. and in the presence of oxygen another type of decomposition takes place which does not start at the chain ends but rather at any part of the molecule, evidently according to a radical mechanism caused by molecular oxygen. The polyoxymethylenes which have their end groups blocked are not stable against this type of attack. Furthermore, a hydrolytic decomposition to formic acid, which is caused by residues of acid catalysts or by formic acid formed by oxidation of formaldehyde split off is connected with the decomposition in the presence of molecular oxygen. For this reason formaldehyde polymers have been mixed with so-called antioxidants or stabilizers, such as phenols, amines, hydrazines, urea compounds and thiourea compounds. The stabilizing action of these substances against decomposition of the polyoxymethylene chains is most varied. The basic substances upon heating engender undesired discolorations and therefore hardly can be used even though, for example, phenyl-β-naphthyl amine otherwise has a very good stabilizing action. The same effect, namely, the discoloration over yellow brown to dark brown or even to black, is obtained generally with phenolic compounds if their admixtures with polyoxymethylenes are contacted with the atmosphere or sunlight at raised temperatures. As a consequence, special complicated polynuclear phenols have been proposed for the stabilization of polyoxymethylene with blocked end groups in German published application 1,082,404. The stabilizing action of the phenols, however, is insufficient as the polyoxymethylenes stabilized therewith, even upon heating under nitrogen, decompose to a certain extent. Presumably this decomposition is caused by the hydrolysing action of the acid reacting phenols. It has furthermore been proposed in German published application 1,083,048 to stabilize polyoxymethylenes against heat with amides of poly basic aromatic sulfonic acids. Polyoxymethylenes thus stabilized exhibit a high stability upon heating under nitrogen. According to German published application 1,076,363, stabilization of polyoxymethylenes against heat, light and oxygen is indicated to be obtained by admixture of derivatives of 1,3,5-thiodiazole therewith. However, with these stabilizers the products in most instances are light yellow and it must be taken into consideration that thiodiazoles easily decompose with discoloration upon heating to higher temperatures.

A prerequisite for disturbance free commercial processing of polyoxymethylenes to shaped products is that the mass to be molded does not suffer changes in mechanical properties or discoloration in the range of temperatures required for molding or by the atmosphere always coming into contact therewith. The influences of atmospheric air can, of course, be overcome by working under an inert atmosphere but this requires considerable technical expenditures. It is difficult to maintain the prerequisites for a proper hot molding of polyoxymethylenes because of the narrow temperature range available for such molding which must be between the melting or softening point and the decomposition temperature of the mass. It has therefore also been attempted to attain a stabilization in the range of the molding temperatures by the addition of other polymeric substances, such as, for example, polyamides. It was, however, found that in such cases it is also necessary in addition to employ the so-called antioxidants, especially, amines or phenols.

According to the invention it was found that polyoxymethylenes having an average molecular weight between about 10,000 and 100,000 and whose end groups are blocked by acylation or etherification which are capable of being shaped mechanically in contact with air at elevated temperatures can be stabilized by mixing small quantities of neutral reacting aromatic compounds which have a boiling point or sublimation point, that is, an evaporation point, above 210° C. and carrying at least one substituent selected from the group of $NO_2$, halogen, —$COC_6H_5$ and alkoxy, preferably, lower alkoxy, groups therewith. Illustrative examples of stabilizing compounds according to the invention, for instance, are: nitrobenzene, o-, p- and m-dinitrobenzene, o-, p- and m-nitroanisole, 1,5-dinitronaphthalene, o-, p- and m-chloronitrobenzene, o-, p- and m-bromonitrobenzene, o-, p- and m-iodonitrobenzene, 2,4-dinitroanisole, 2,4-dinitrochlorobenzene and benzophenone. An especially suited stabilizing compound is m-dinitrobenzene.

The good compatability of the substances employed according to the invention with polyoxymethylenes and their good stabilizing action could in no way be expected, as both substances do not undergo any chemical reaction with each other. It also could be ascertained that monomeric formaldehyde evidently also does not react with such substances as the presence of such substances does not influence the polymerization of monomeric formaldehyde, if they are present as solvents or diluents.

The substances which are used as stabilizers according to the invention are employed in quantities of 0.01 to 10%, preferably 0.1 to 2% by weight with reference to the polyoxymethylene to be stabilized. The powder formed polyoxymethylene can be mixed with the stabilizing substances according to the invention in any desired manner. It is, however, expedient to take care that as homogeneous a mixture as possible is achieved. For example, the powdered polyoxymethylene can be treated with a solution of the stabilizing substances in a volatile solvent with subsequent evaporation of the solvent. It is also possible to effect the admixture of the components in the fused state.

The stabilizers can, of course, be employed individually or in combination with each other or other known compatible stabilizers.

The thermoplastic masses obtained according to the invention can be processed in a commercially satisfactory manner by casting, injection molding, or pressure molding to fibers, filaments, foils, bands, as well as profiled objects. In many instances it was found that the stabilizers according to the invention also reduce to a far-reaching degree the decomposition accompanied by undesired gassing which often is engendered during the hot shaping by dyes, pigments or fillers which have been admixed with the polyoxymethylenes.

The following examples will illustrate the stabilizing action obtainable with the stabilizers according to the invention. In testing, the stabilization action was ascertained by heating a 200 mg. sample of the stabilized powdered polyoxymethylene, rather than with molded compacts, in an open test tube for 20 minutes at 200° C. or for the period of time and at the temperature specified and the weight loss engendered thereby determined. The percentage of weight loss is given as the evaporation number. The powdered polyoxymethylenes were stabilized by mixing a solution of the appropriate quantity of stabilizer in methanol with a suspension of the polyoxymethylene in methanol and evaporating off the methanol.

EXAMPLE 1

5 g. samples of acetylated polyformaldehyde with an average molecular weight of 45,000 were stabilized with various quantities of o-chloronitrobenzene and then tested for the stabilizing action achieved. The results are given in the following Table 1:

Table 1

| Quantity of stabilizer, percent: | Evaporation No., 20 mins. 200° C., percent |
|---|---|
| 0 (control) | 30 |
| 0.5 | 6 |
| 1.0 | 5 |
| 2.0 | 5 |

In each instance the melted stabilized masses and the resolidified fused masses were of a pure white color.

EXAMPLE 2

10 g. samples of an acetylated high molecular weight polyoxymethylene with an average molecular weight of 70,000 were stabilized with various quantities of m-dinitrobenzene and tested for stabilizing action achieved. The results are given in the following Table 2:

Table 2

| Quantity of stabilizer, percent: | Evaporation No., 20 mins. 200° C., percent |
|---|---|
| 0 (control) | 47 |
| 1.0 | 3.7 |
| 2.0 | 4.4 |

In each instance the stabilized polyoxymethylene retained its pure white color after the stabilization test.

Tests carried out in the same manner using m-dinitrobenzene but in conjunction with another polyoxymethylene gave the results given in the following Table 3:

Table 3

| Quantity of stabilizer, percent: | Evaporation No., 20 mins. 200° C., percent |
|---|---|
| 0 (control) | 30 |
| 0.25 | 3.8 |
| 0.50 | 4.6 |
| 1.00 | 4.8 |

In this instance also, the pure white color was retained.

EXAMPLE 3

Samples of an acetylated polyoxymethylene of an average molecular weight of 40,000 were stabilized with 1% (unless otherwise specified in the table below) of various stabilizing compounds according to the invention and then tested for the stabilizing action achieved. Except when the stabilizing compounds themselves were colored, the white color of the polyoxymethylene was retained even after the heating. When the stabilizers were themselves colored this color was transferred to the polyoxymethylene mass with a corresponding reduction in intensity. The following Table 4 gives the results of the stabilization tests:

Table 4

| Stabilizer | 30 mins. 180° C. | 20 mins. 200° C. | 30 mins. 200° C. |
|---|---|---|---|
|  | Percent | Percent | Percent |
| None (control) | 12.4 | 30 | 38.8 |
| m-Chloronitrobenzene | 3.4 | 5.3 | 7.5 |
| p-Chloronitrobenzene | 3.39 | 5.0 |  |
| o-Bromonitrobenzene |  | 6.5 |  |
| m-Bromonitrobenzene |  | 5.3 |  |
| p-Bromonitrobenzene |  | 5.4 |  |
| o-Iodonitrobenzene |  | 9.5 |  |
| m-Iodonitrobenzene |  | 6.6 |  |
| p-Iodonitrobenzene |  | 7.8 |  |
| m-Nitroanisole |  | 5.1 |  |
| p-Nitroanisole | 2.39 | 5.3 | 6.32 |
| o-Dinitrobenzene |  | 5.5 |  |
| m-Dinitrobenzene (0.25%) | 3.4 | 3.8 | 5.6 |
| p-Dinitrobenzene |  | 4.6 |  |
| 2,4-dinitroanisole |  | 4.4 |  |
| 2,4-dinitrochlorobenzene | 2.28 | 4.7 | 6.85 |
| 1,5-dinitronaphthalene |  | 8.2 |  |
| Benzophenone |  | 10.0 |  |

The term evaporation point is used herein to signify the boiling or sublimation point of a substance, that is, the temperature at which the vapor pressure of the substance equals 760 mm. Hg.

I claim:

1. A polyoxymethylene composition capable of being shaped mechanically at elevated temperatures in contact with air comprising a polyoxymethylene having an average molecular weight between 10,000 and 100,000 selected from the group consisting of polyoxymethylene homopolymers having their terminal hydroxy groups esterified and polyoxymethylenes having their terminal hydroxy groups etherified and 0.01–10% by weight based upon the polyoxymethylene of a neutral aromatic compound having an evaporation point above 210° C. selected from the group consisting of o-dinitrobenzene, m-dinitrobenzene, p-dinitrobenzene, o-chloronitrobenzene, m-chloronitrobenzene, p-chloronitrobenzene, o-bromonitrobenzene, m-bromonitrobenzene, p-bromonitrobenzene, m-nitroanisole, p-nitroanisole, 2,4-dinitroanisole and 2,4-dinitrochlorobenzene.

2. A composition according to claim 1 in which the quantity of said aromatic compound is 0.1 to 2% based on the polyoxymethylene.

3. A composition according to claim 1 in which said aromatic compound is m-dinitrobenzene.

References Cited by the Examiner

UNITED STATES PATENTS

| 2,848,437 | 8/1958 | Langsdorf et al. | 260—45.9 |
| 2,871,220 | 1/1959 | MacDonald | 260—45.9 |
| 2,893,972 | 7/1959 | Kubico et al. | 260—45.9 |
| 3,050,500 | 8/1962 | Sherwood | 260—45.95 |
| 3,079,366 | 2/1963 | Boyle et al. | 260—45.9 |
| 3,081,280 | 3/1963 | Carlson | 260—45.9 |
| 3,174,937 | 3/1965 | Strobel et al. | 260—45.9 |

LEON J. BERCOVITZ, *Primary Examiner.*

H. E. TAYLOR, Jr., *Assistant Examiner.*